(12) United States Patent
Rajan et al.

(10) Patent No.: US 8,351,342 B2
(45) Date of Patent: Jan. 8, 2013

(54) SYSTEM DETERMINATION EMULATOR FOR ANALYSIS AND TESTING

(75) Inventors: Rajeev D. Rajan, San Diego, CA (US); Andrew T. Hunter, San Diego, CA (US); Rotem Cooper, San Diego, CA (US); Tomas Galvez Santaella, Boulogne-Billancourt (FR)

(73) Assignee: QUALCOMM Incorporated, San Diego, CA (US)

( * ) Notice: Subject to any disclaimer, the term of this patent is extended or adjusted under 35 U.S.C. 154(b) by 1060 days.

(21) Appl. No.: 11/474,248

(22) Filed: Jun. 23, 2006

(65) Prior Publication Data

US 2008/0293402 A1 Nov. 27, 2008

Related U.S. Application Data

(60) Provisional application No. 60/693,462, filed on Jun. 23, 2005.

(51) Int. Cl.
*H04L 12/26* (2006.01)

(52) U.S. Cl. .......................... 370/252; 370/328; 370/331

(58) Field of Classification Search .......................... None
See application file for complete search history.

(56) References Cited

U.S. PATENT DOCUMENTS

| | | | |
|---|---|---|---|
| 5,159,625 A | 10/1992 | Zicker | |
| 5,802,105 A * | 9/1998 | Tiedemann et al. | 375/225 |
| 5,953,320 A * | 9/1999 | Williamson et al. | 370/252 |
| 6,014,565 A * | 1/2000 | Bonta | 455/437 |
| 6,052,584 A * | 4/2000 | Harvey et al. | 455/423 |
| 6,111,857 A * | 8/2000 | Soliman et al. | 370/254 |
| 6,324,406 B1 * | 11/2001 | Zadeh | 455/456.2 |
| 6,625,451 B1 * | 9/2003 | La Medica et al. | 455/434 |
| 7,046,640 B2 * | 5/2006 | Silva et al. | 370/318 |
| 7,110,766 B1 * | 9/2006 | Tayloe et al. | 455/438 |
| 7,561,876 B2 * | 7/2009 | Chiou et al. | 455/423 |
| 7,701,905 B2 * | 4/2010 | Farley et al. | 370/331 |
| 7,885,243 B2 * | 2/2011 | da Costa et al. | 370/338 |
| 2002/0193111 A1 * | 12/2002 | Wallstedt et al. | 455/434 |
| 2003/0188029 A1 * | 10/2003 | Shafran et al. | 709/249 |
| 2006/0039538 A1 * | 2/2006 | Minnis et al. | 379/1.01 |

FOREIGN PATENT DOCUMENTS

EP 1424861 6/2004

OTHER PUBLICATIONS

International Search Report and Written Opinion—PCT/US2006/024982, International Search Authority—European Patent Office—Apr. 18, 2007.

\* cited by examiner

*Primary Examiner* — Michael J Moore, Jr.

(74) *Attorney, Agent, or Firm* — Michelle Gallardo; Nicholas J. Pauley; Jonathan T. Velasco (57) ABSTRACT

A roaming emulator provides a tool for emulating system determination for monitoring the operation of a wireless communication device (WCD) during system determination. A signal monitoring program and service selection protocol are stored, and a signal emulation module provides a signal emulation output in accordance with a predetermined set of data. A processing module performs a simulation of a service selection procedure based on the service selection protocol and performed in accordance with the signal monitoring program and the signal emulation output. A result of the service selection is provided by an output module. The emulator can provide emulated system scanning based on geographical or market location, and can emulate scenarios when channels from neighboring systems or markets "bleed" into the RF environment of the WCD.

29 Claims, 11 Drawing Sheets

INFORMATION WINDOW

VOICE INFORMATION

| MARKET NAME | BAND CLASS | CHANNEL | STATE | COUNTRY | TECH-NOLOGY | SID | NID | OPERATOR | DOCUMENT |
|---|---|---|---|---|---|---|---|---|---|
| ☑ ABC | 0 | 384 | Katif | NAR | CDMA | 16528 | 65535 | ABC LAN CELLULAR | ABC LAN |
| ☐ ABC | 1 | 425 | Katif | NAR | CDMA | 16270 | 65535 | NORTE COMMUNICATION | Nortecom |
| ☐ ABC | 1 | 500 | Katif | NAR | CDMA | 16270 | 65535 | NORTE COMMUNICATION | Nortecom |
| ☐ ABC | 1 | 575 | Katif | NAR | CDMA | 16270 | 65535 | NORTE COMMUNICATION | Nortecom |
| ☑ ABC | 1 | 625 | Katif | NAR | CDMA | 16270 | 65535 | NORTE COMMUNICATION | Nortecom |
| ☑ XYZ | 1 | 725 | Katif | NAR | CDMA | 16270 | 65535 | NORTE COMMUNICATION | Nortecom |
| ☑ XYZ | 1 | 850 | Katif | NAR | CDMA | 16270 | 65535 | NORTE COMMUNICATION | Nortecom |
| ☑ XYZ | 0 | 333 | Katif | NAR | AMPS | 16333 | 65535 | KELIF CEL | JADISCEL |
| ☑ XYZ | 0 | 384 | Katif | NAR | CDMA | 16527 | 65535 | Yamit Cellular | Yamit Cellular |

DATA INFORMATION

| MARKET NAME | BAND CLASS | CHANNEL | STATE | COUNTRY | TECH-NOLOGY | SUBNET | OPERATOR |
|---|---|---|---|---|---|---|---|
| | | | | | | | |

PRL | MRU | RF ENVIRONMENT

[CHANGE LOCATION] [BLEED SYSTEMS] [MANUAL INPUT]

| RF MANUAL INPUT | ✕ |

DESCRIPTION

MARKET NAME [            ]

OPERATOR NAME [            ]

TECHNOLOGY PARAMETERS

TYPE [VOICE ▼]

TECHNOLOGY [CDMA ▼]

BAND CLASS [0]

CHANNEL [283]    STD [A ▼]

SYSTEM IDENTIFICATION

SID [0]

NID [0]

SUBNET ID [000000000000000000000000000000000000]

[ ADD ]    [ CANCEL ]

SYSTEM DETERMINATION EMULATOR FOR ANALYSIS AND TESTING

CLAIM OF PRIORITY UNDER 35 U.S.C. §119

The present application for patent claims priority to Provisional Application No. 60/693,462 entitled "PREFERRED ROAMING LIST TRACER" filed Jun. 23, 2005, and assigned to the assignee hereof and hereby expressly incorporated by reference herein.

BACKGROUND

1. Field of the Invention

This invention relates to simulation tools, and more particularly to a tool for simulating a wireless environment for a multiuser subscriber communication system.

2. Background

Wireless communication devices (WCDs) are becoming increasingly commonplace. For example, millions (if not billions) of individuals own and/or utilize one or more WCDs such as, but not limited to, a mobile phone, personal data assistant (PDA), a wireless gaming device and a computer with wireless capabilities. To support the growing numbers of WCDs, there are also many numbers of service providers. A user subscribes with one of these service providers to receive service.

Each carrier forms a network that provides wireless service to its subscribers in various geographical areas of the world. For example, one service provider may provide service covering the East Coast region of the United States while another may provide service covering various portions across the United States. In order to provide wider geographical service to the subscribers, two or more service providers (hereinafter roaming partners) may form agreements that allow subscribers of one network to access other networks.

Thus, when a subscriber enters a region that is not directly covered by its carrier, but is covered through an agreement, the WCD of the subscriber is said to be "roaming." A WCD in a roaming mode scans for and selects a network to provide service to the WCD. Depending on agreements, if any, and/or policies, each service provider has a roaming list that assists a WCD in acquiring service. The roaming list is an indexed list of systems or networks that is stored in each WCD and may be proprietary. Additionally, a set of data structures and algorithms, for service selection identifies the best network suitable for a given WCD to operate in a given environment.

The roaming list can be any listing compatible with the communication standard used by the WCD. Examples of roaming lists are a public land mobile network list (PLMN list) and a Preferred Roaming List (PRL). The set of data structures and algorithms may be called system determination (SD) and can be used in combination with the roaming list to provide the identification of the best network suitable for the operation of a given WCD. While the terminology "PRL" and "system determination" are used herein, it is understood that the concepts are applicable to a variety of standards and technologies used in connection with wireless networks and wireless subscriber networks.

As applied to roaming, a Technical Data Sheet (TDS) is a document exchanged by roaming partners as a listing of available services to convey changes and additions to the network elements. It may contain information such as, but not limited to, the Home Location Resource (HLR), switches, SIDs, channel information and contact information. The TDS is used to help create the PRL, but is not standardized and exists in different formats.

The system determination procedure uses the PRL in the WCD to select a system that will provide service to the WCD. This selection process is not standardized. Also, the system determination is dependent on the OEM's implementation and may be proprietary. Accordingly, service providers may have no specific insight on how a particular system was selected. Therefore, it can be difficult for service providers to troubleshoot PRL problems. On the other hand, due to the proprietary nature of PRLs, it may be difficult for OEM to help troubleshoot the PRL problem. For example, a representative of OEM can manually examine the PRL and step through it's contents, while making assumptions on how the PRL is being executed in the service provider's environment. Therefore, there is a need to provide information that is useful to the service providers without compromising the proprietary information.

SUMMARY

Apparatus for use in monitoring the operation of a wireless communication device (WCD) during system determination includes memory stores to store a signal monitoring program module and to store a service selection protocol module. A signal emulation software module provides an output in accordance with a predetermined set of data and a processing module uses data from the memory stores to perform a simulation of a service selection procedure. The service selection procedure is based on the service selection protocol and performed in accordance with the signal monitoring program and the signal emulation output, and an output module provides a result of the service selection.

In one configuration, a memory store is configured to store a signal monitoring program module, and configured to store a service selection protocol module. The memory store may be provided as separate memory stores, or may take the form of combined storage.

The signal emulation module may provide simulated signal inputs established according to a location selection provided to the signal emulation module. The signal monitoring program may include a station search protocol provided for simulation of service determination. Another feature permits the apparatus to perform emulations in accordance with data from a technical data sheet or a list of available network services. Also, external signal inputs may provide data for the processing module to use as the signal emulation output in lieu of the outputs of the signal simulation module.

In another aspect, an apparatus for use in monitoring the operation of a WCD during system acquisition includes means for loading a signal monitoring program, means for loading a service selection protocol, means for performing a system determination procedure based on the service selection protocol and the signal monitoring program, and means for outputting the results of the system determination.

In a further aspect, a method for use in monitoring the operation of a WCD during a cell search procedure includes storing a service selection protocol, providing a signal monitoring emulation, performing a simulation of a service selection based on the station selection protocol in accordance with an output of the signal monitoring emulation and outputting the results of the service selection.

DETAILED DESCRIPTION

The techniques disclosed herein address at least the above stated needs by providing a tangible output of the system determination procedure and/or results. For example, a trace map of the systems that are being considered by the system determination procedure and/or their sequence in the selection process may be output. This can be done without revealing the inner operation of the system determination algorithm and/or code.

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may be shown in detail in order not to obscure the embodiments.

Also, it is noted that the embodiments may be described as a process which is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

As disclosed herein, a storage medium or module may represent one or more devices for storing data, including read only memory (ROM), random access memory (RAM), magnetic disk storage mediums, optical storage mediums, flash memory devices and/or other storage medium for storing information. The term storage medium includes, but is not limited to portable or fixed storage devices, optical storage devices, wireless channels and various other mediums capable of storing, containing or carrying instruction(s) and/or data, typically as mass memory used for computing. This can be read/write memory such as a computer's hard drive or other mass storage and constitutes a memory store. In some cases, the memory store can be in the form of permanent memory such as memory stored on read-only optical discs.

The memory may also be external to the device, and/or data may be provided through wireless channels and various other mediums capable of storing, containing or carrying instructions and/or data.

Operational Environment

Figure 1:
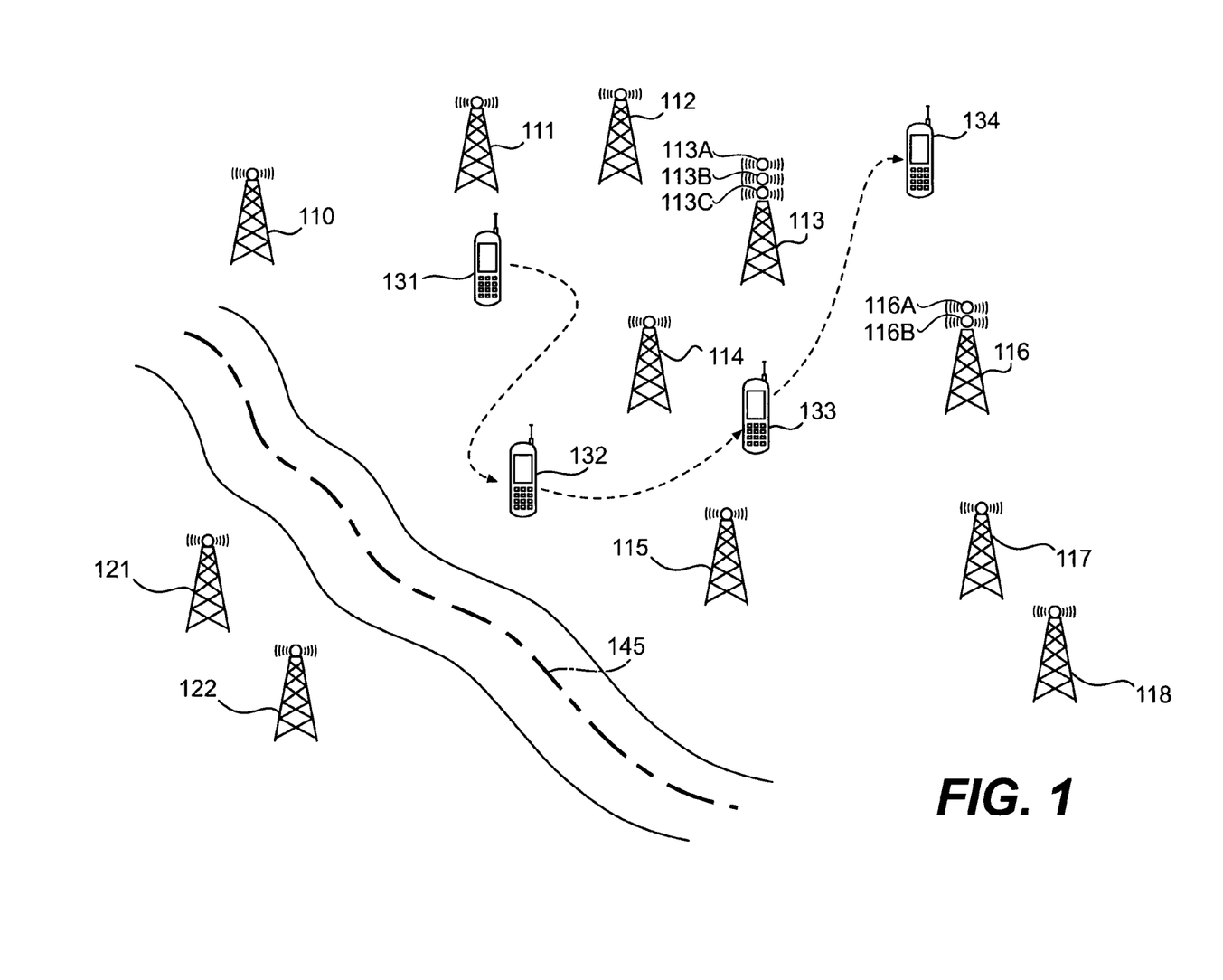
FIG. 1 illustrates an example wireless environment in a local geographical area.

FIG. 1 is a diagram depicting an example wireless environment in a local geographical area. A plurality of base stations 110, 111, 112, 113, 114, 115, 116, 117, 118, 121, 122 are depicted at different physical locations. A wireless communication device (WCD) shown at 131, 132, 133, 134 is able to communicate through the base stations 110-122 if the WCD is within a suitable signal range of one or more of the base stations 110-122. The base stations 110-122 may be a part of a primary carrier's system in a local market, or may belong to those of another carrier. Often base stations 110-122 are used by multiple carriers, and in some cases multiple carriers co-locate their base stations, as depicted at 113A, 113B, 113C and at 116A and 116B. In addition to the different carriers, the base stations may be assigned to different geographic markets of the different carriers. A further distinction is that the different base stations may offer different types of communication service, such as CDMA, WCDMA, OFDM, GSM-based communication systems or AMPS service.

If the WCD is programmed to permit roaming off-network, the WCD may select the various base stations in accordance with a service determination procedure. In one configuration, the service determination procedure is implemented by a preferred roaming list (PRL). The PRL includes a system table and an acquisition table. The system table contains records identifying a system, for example by its System Identification number (SID) and Network Identification number (NID). For each record, there is an indicator indicating a class of preference of the system, such as numerical, positive or negative. The system table also contains the roaming status that should be indicated by the WCD, the relative priority of the system and its geographic region. The acquisition table provides the band and frequencies that the WCD is to use when attempting to acquire the system.

The approach is intended to provide the WCD with instructions to communicate with the base stations 110-122 according to roaming preferences set by the carrier. Ideally, the WCD should communicate with its home network in preference to roaming, and should roam according to preferences established by the PRL.

If, for example, the WCD is at position 131, then the nearest stations are 110-114. These may be on the same or different networks, or multiple networks may be co-located, as depicted at 113A, 113B, 113C. The WCD may move, for example to positions 132, 133 and 134, in which case the WCD establishes communication links with different ones of the base stations 110-118. In the case of the WCD being at location 132, it is possible that the best connection is through base station 122, located across an international border 145. While the user may rightfully presume that location 132 is on one side of the border, it may be that the only available communication link effects roaming across the international border 145 by establishing a link with a base station 122. This roaming option may be valid for users who place calls from across the border, but can be unexpected when the user is on one side of the border establishing a wireless link on the other side.

International border 145 is an extreme example of a border as applied to wireless technology. In addition to the example depicted of the international border 145, there are also non-political borders of regions related to the various system operations of wireless service providers. These are variously referred to by different terms, such as service areas, service territories, local areas and markets, and may be as arbitrary as political borders. For the purpose of evaluation of roaming performance, borders generally are more often those related to territories established by service providers.

Simulator Operation

Figure 2:
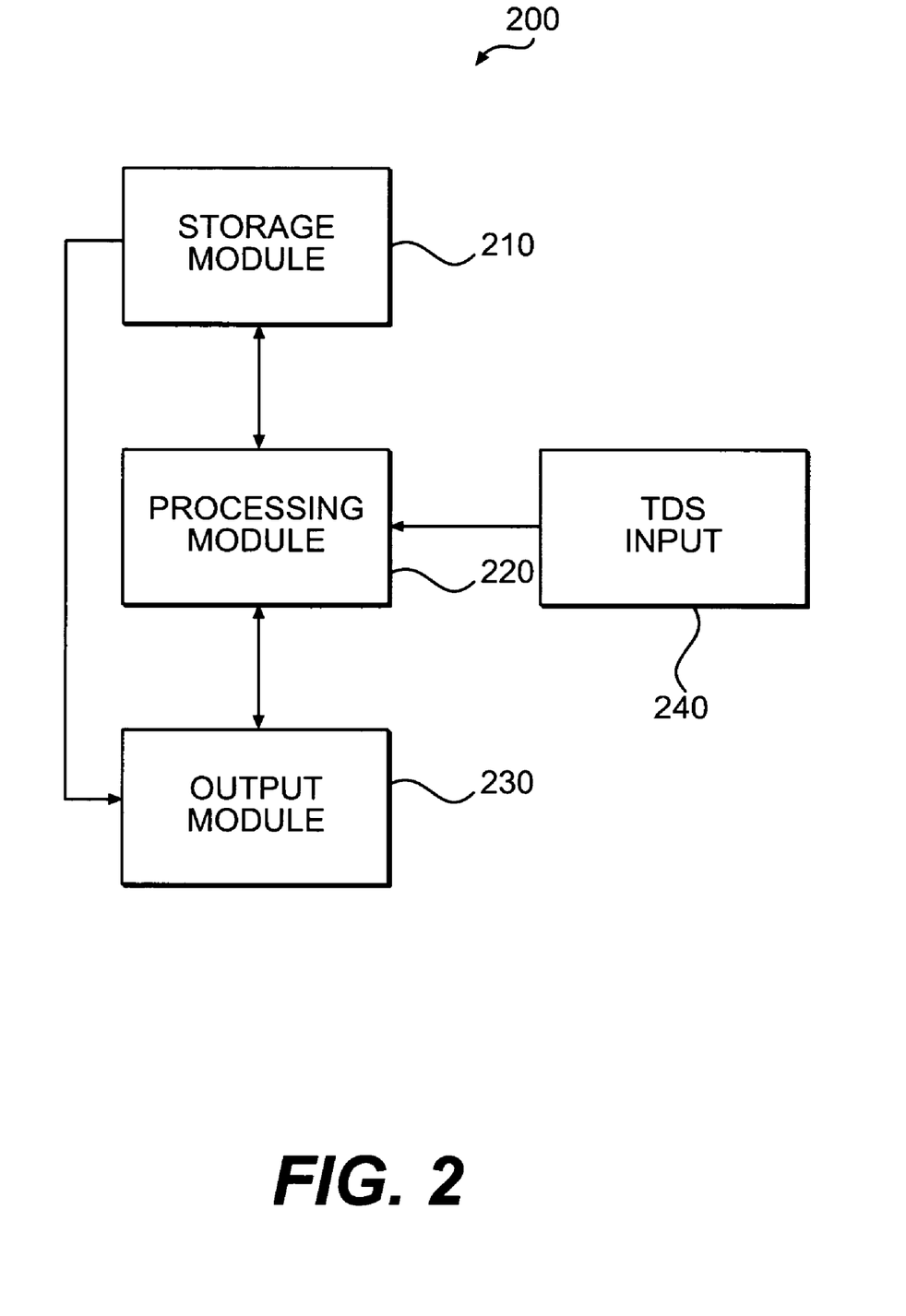
FIG. 2 illustrates an example device used in monitoring the operation of a WCD during system acquisition.

FIG. 2 is an example block diagram showing a simulation device 200 that may be used in monitoring the operation of a WCD during system acquisition. Device 200 may be a desktop computer, a laptop computer or various other devices having processing capabilities. Device 200 comprises a memory store 210 configured to store a monitoring program; a processing module 220 configured to perform a system determination procedure based on a preferred roaming list and the monitoring program, and an output module 230 configured to output the results of the system determination. Memory store 210 may take various forms, typically in the form of computer memory.

The system determination procedure may include various processes and/or may generate various results. The system determination may be implemented to perform one or a combination of a pilot scanning, a system acquisition, a system selection, or other processes associated with the system determination. Accordingly, output module 230 may output the results of the pilot scanning, the system acquisition, the system selection, other processes, or a combination thereof.

The monitoring program may be an executable program file and memory store 210 may store the SD algorithm or codes as library files, such that the SD codes are not revealed. The monitoring program interfaces is then executable by processing module 220 using the library files. The monitoring program and the library files may be downloaded through a network or may be transferred through another storage medium.

Since the monitoring program is used for simulation, the processing can be monitored with device 200 not connected to any live RF environment nor WCD, in which case, the RF environment is emulated. This is non-intrusive to the operation of the system determination in the live RF environment. More particularly, processing module 220 may be configured to emulate the system determination based on a technical data sheet (TDS). Device 200 may further comprise a TDS input unit 240 configured to receive the appropriate TDS for use by processing module 220.

As a result of use of the monitoring program and the SD algorithm stored in memory store 210, the simulation is an actual system determination such as that performed by a WCD. Therefore, if actual signals are used, the simulation will be an actual system determination using live signals. This simulation may also be performed with a signal emulator, in which case the simulation is an actual system determination as performed with the emulated signals.

Processing module 220 may emulate the system determination during various conditions and/or functions. For example, the system determination may be performed when a WCD is powered up, when a system is reacquired after the system is lost or when a WCD is powered down. Other conditions may be emulated such as, but not limited to, bad overhead messages, border interference scenarios, and complex signal interference situations. It should be apparent to those skilled in the art that there are many different conditions and/or functions that can be emulated in order to monitor and/or analyze the system determination performance. Some effects can be characterized in a manner that provides a convenient means for describing the effect. For example border scenarios can be described as "add bleed", which indicates to the user that transmissions are bleeding over into the wireless environment in the simulation. Therefore, the terminology "bleed" is used by the system to describe the interaction of wireless services across regions defined either by the service providers or by the simulation. This description indicates to the user that an interaction between regions is occurring in either the simulation or in the real environment.

Device 200 may also comprise a user interface configured to receive commands to perform the various processes and/or functions associated with a system determination. The user interface may be implemented to receive commands such as to, but not limited to, initiate a pilot scanning, stop a pilot scanning, save a current result of a pilot scanning, open a stored result of a pilot scanning, emulate a WCD power up, emulate a system loss, emulate reacquisition of a system, and emulate a WCD power down.

Figure 3:
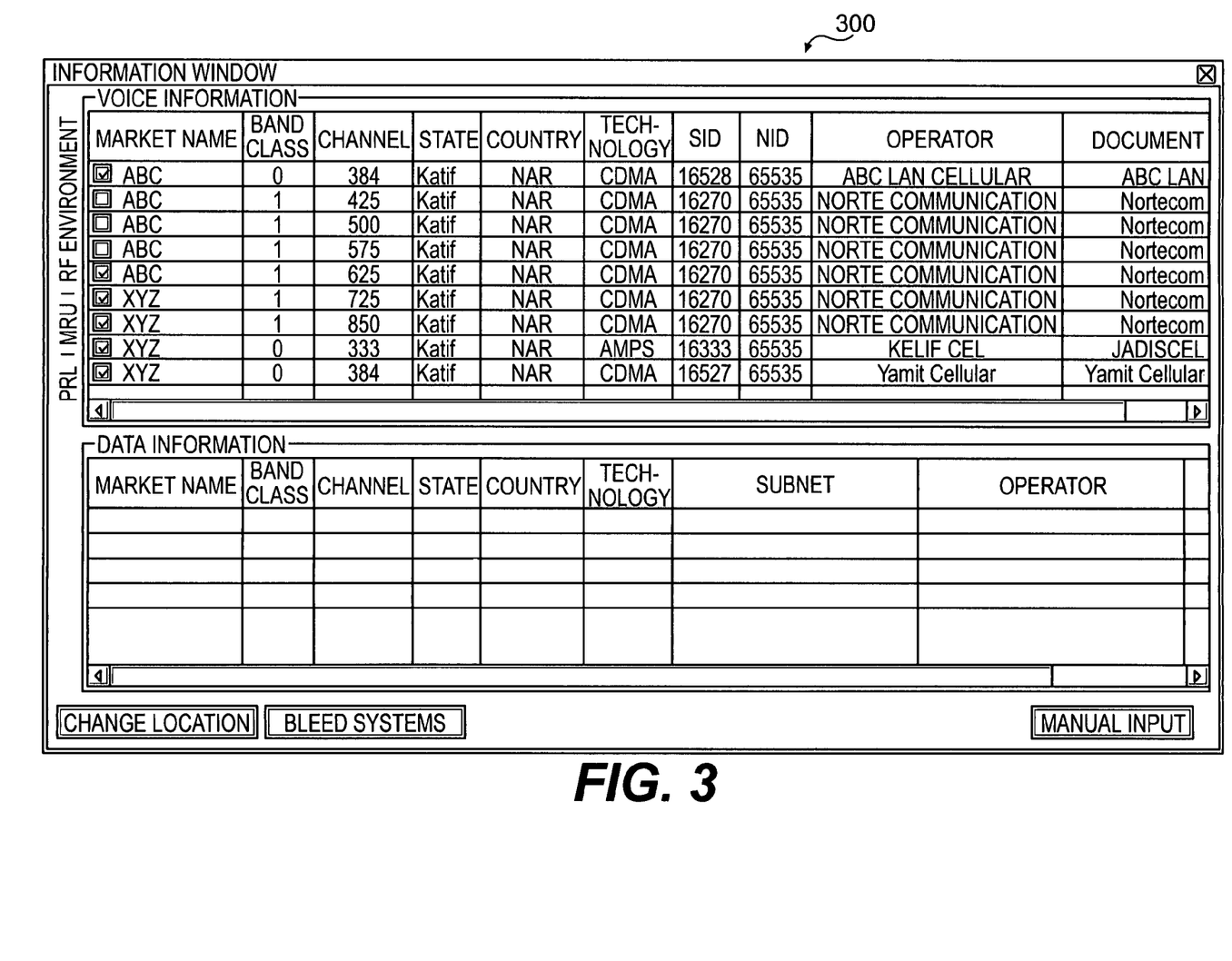
FIG. 3 illustrates a representation showing an example of a user display.

Output module 230 may include a display module configured to display the results of system determination. FIG. 3 is a representation showing an example of a display 300 that may be displayed by a display module. Display 300 displays information such as a scanning progress, a serving system, location, a scan list and an alternate scan list. As depicted, the display is indicating various geographical designations.

Display 300 may further include a user interface. The user interface may comprise input interface to initiate a pilot scanning, stop a pilot scanning, save a current result of a pilot scanning, open a stored result of a pilot scanning.

While display 300 shows a display of certain information, it should be apparent to those skilled in the art that other information can be displayed as needed. Similarly, while display 300 shows a user interface with a certain input interface, it should be apparent to those skilled in the art that other input interface to perform various processes may be implemented. The display 300 may be operated on a general purpose operating system such as Microsoft Windows or Unix environment. Other applications and/or environments can be implemented.

As depicted in FIG. 3, the display includes relevant data such as market name, channel information, geographical information, information concerning the system operator, and data related to the source of information. The particular information displayed is a matter of design choice, for example providing a display of "Voice Information" and "Data Information" as shown. Additionally, a parallel set of information can be provided. In depiction of FIG. 3, the first set of displayed data is indicated as "Voice Information" and the second set of displayed data is indicated as "Data Information"; however it is possible to provide different displays. The display of the information and/or user interface may be re-arranged and/or modified in various ways to provide a different "look and feel." In addition, the content and display format of the information may be re-arranged and/or modified, and information can be added or deleted. For example, while the content of scan list may have more or less than the number "No.", "Mode," Band Class "B and C", "channel" and "SID." It can have a display format that displays the list from high number to low number. In another example, the location information may list the user's location in other forms such as, but not limited to, latitude and/or longitude, a particular market location, a city, a county, a district and state. It would be apparent to those skilled in the art that the actual information displayed would vary based on such location and system supporting the network. This window contains the current RF information about existing systems and channels of operation. This information is obtained from a carrier's TDS, and shows the current preferred roaming list (PRL) data loaded into the software. In a typical emulation, this information is used to scan available channels.

The display can include multiple windows, such as the separate "Voice Information" and "Data Information" depicted. The particular depiction shows the "Data Information" as having different fields than displayed for the "Voice Information". Other options may include "Change Location", "Bleed Systems" and "Manual Input" selections, depicted as radio button selections on the display. The "Change Location" selection allows the user to change the location to a different location either within a local area as depicted in FIG. 1, or over a large geographical area. The "Bleed Systems" selection permits "bleed" from neighboring markets or systems to be introduced into the simulation. This allows the simulation to incorporate interaction of wireless services across regions. The "Manual Input" selection permits the user to input details manually, either to test the effect of an additional variable into the wireless environment or to incorporate data not included in the databases stored in device 200. The user interface for these options will be described in connection with FIGS. 7-9.

Referring back to FIG. 2, it should be noted that device 200 is a simplified example for the purposes of explanation. Therefore, device 200 may comprise other elements and/or functions. For example, it may comprise an input module coupled to processing module 220 and configured to receive the preferred roaming list for use by processing module 220. Also, one or more of the various elements of device 200 can be rearranged and/or combined without affecting the operation of the system determination in order to monitor and/or analyze the various processes.

Therefore, information associated with a system determination procedure is provided in a visual and textual output without revealing the algorithm and/or code. By providing such information, users can troubleshoot PRL problems and/or get a better understanding of the PRL in relation to SD. For example, a user can compare the results with the expected behavior. Accordingly, improvements and/or modifications can be made to support technologies relying on the PRLs used by the system determination process to select systems, thereby providing better and/or more efficient service to WCDs.

The processing module 220 may be configured to perform system determination in a manner which does not permit the user to decode the system determination algorithms or software. If the system determination algorithms are not disclosed to the user, the system determination function is a black box function. Therefore, since what the system determination does is in effect treated as a black box, modifications and/or changes to the code to maintain secrecy of the code are significantly eliminated, thereby reducing the cost and overall efficiency. Advantageously, the system determination is performed in the manner performed by a WCD. As a result, the processing module performs the same system determination as performed by a WCD.

While device 200 has been described in an emulated mode, in some implementations, device 200 may be implemented to perform in a live mode. More particularly, in the emulated mode, device 200 selects a user-location subset of records from the TDS file and if a band class, channel pair to be scanned occurs in the selected subset, a system is deemed to be found. In the live mode, device 200 may be implemented to connect live with a base station in order to detect or receive some form of actual RF for a band class and channel to be scanned.

Figure 4:
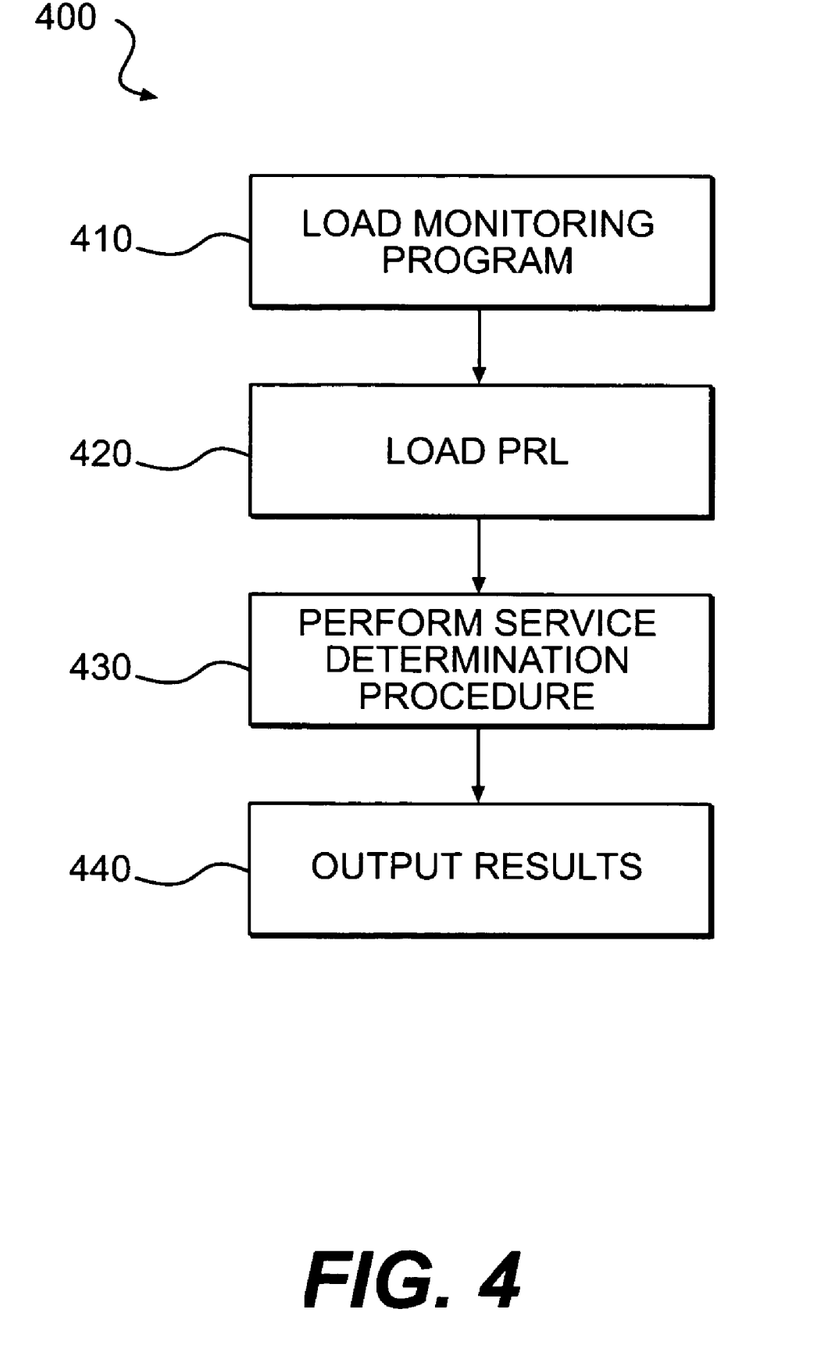
FIG. 4 illustrates an example method for performing system determination.

FIG. 4 is a flow chart showing an example method 400 corresponding to the operation performed by device 200. Method 400 comprises loading (step 410) a monitoring program, loading (step 420) a preferred roaming list, performing (step 430) a system determination procedure based on the preferred roaming list and the monitoring program, and outputting (step 440) the results of the system determination. The performing the system determination may comprise performing a pilot scanning, a system acquisition and/or a system selection. Outputting the results may comprise outputting the results of the pilot scanning, the system acquisition and/or system selection.

The method may comprise receiving a command to initiate a pilot scanning, receiving a command to stop a pilot scanning, receiving a command to save a current result of a pilot scanning, receiving a command to open a stored result of a pilot scanning, and/or receiving a technical data sheet; and wherein performing the pilot scanning comprises emulating the pilot scanning based on a technical data sheet. Emulating the pilot scanning may comprise emulating the pilot scanning when a WCD is power up and/or when a system is reacquired after the system is lost. If in emulated mode, the method may further comprise receiving a command to emulate a WCD power up, emulate a system loss, emulate reacquisition of a system and/or emulate a WCD power down. Outputting the results may comprise displaying either one or a combination of a scanning progress, a serving system, location, a scan list and an alternate scan list.

Figure 5:
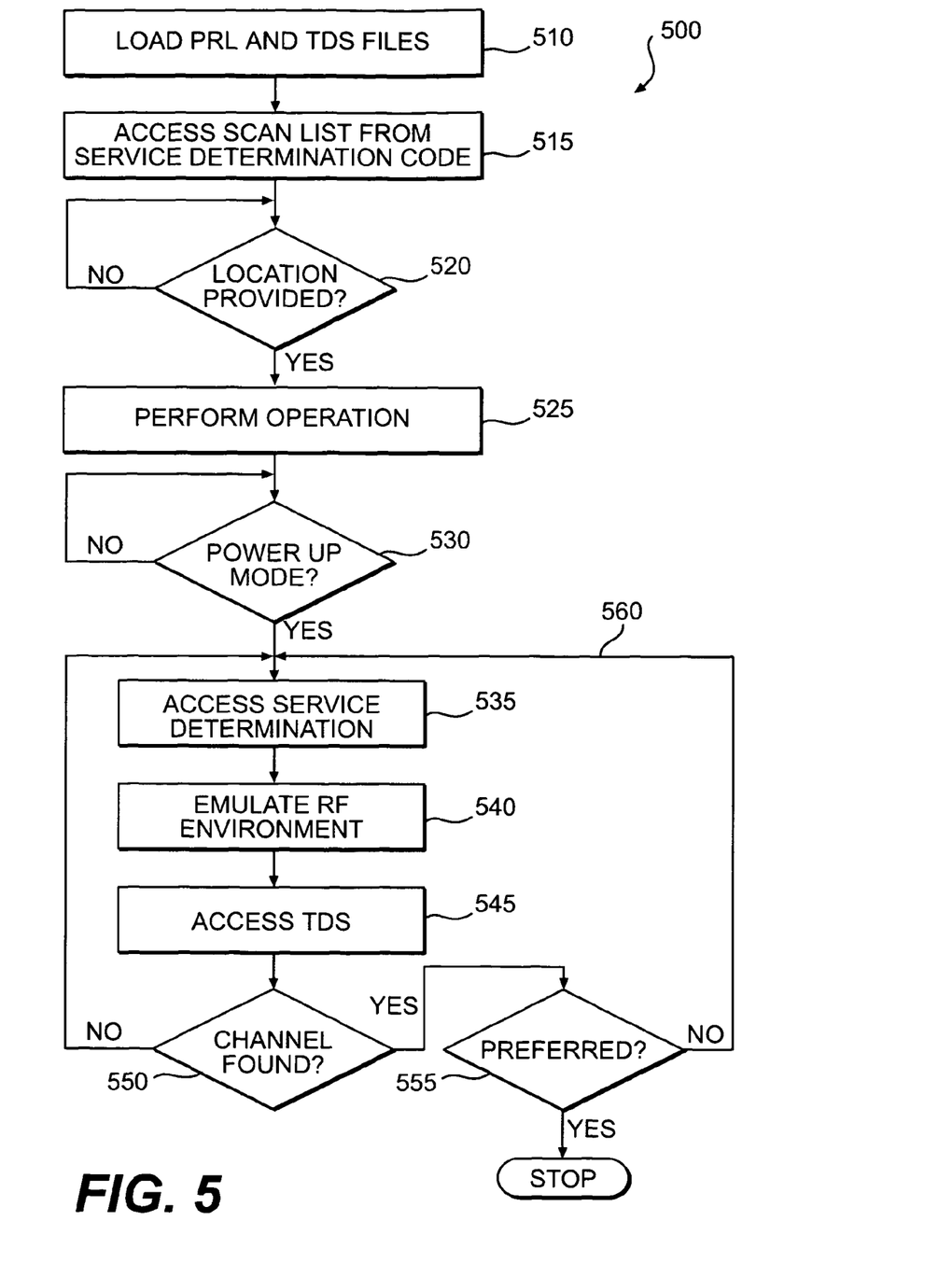
FIG. 5 illustrates an example system determination operation in an emulation mode.

FIG. 5 is a flowchart showing an example of a simplified system determination operation 500 in an emulation mode that can be implemented by device 200. First the PRL and TDS files are loaded (step 510). Once the files are loaded, the internal data structure is set up in device 200. Thereafter, the scan list is accessed (step 515) from the SD code. Once a location is provided (step 520), the SD operation is ready to be performed (step 525). If in a powered up mode (step 530), the SD code is accessed (step 535) for the band class and channel information. The RF environment is emulated (step 540) and the TDS is accessed (step 545) for location. When a channel is found (step 550), the process stops if the channel found (step 555) is a preferred channel. Otherwise, channel searching continues (step 560).

The system can load an alternate version of a PRL and perform the system determination 500 using the alternate PRL. This permits the operator to perform simulations of different PRLs in comparison. Similarly, comparative simulations can be performed with alternate TDS versions.

The simulation can be performed according to different capabilities assigned to the WCD. For example, a simulated WCD can be assigned different communication service capabilities, which, for example, could indicate the effects of the service on roaming. In a "phone" mode, the software will perform an emulation to behave as a WCD automatically, and will try to acquire systems in a scanning operation, accept handoffs and attempt to re-acquire a communication link when the connection to the system is lost.

Figure 6:
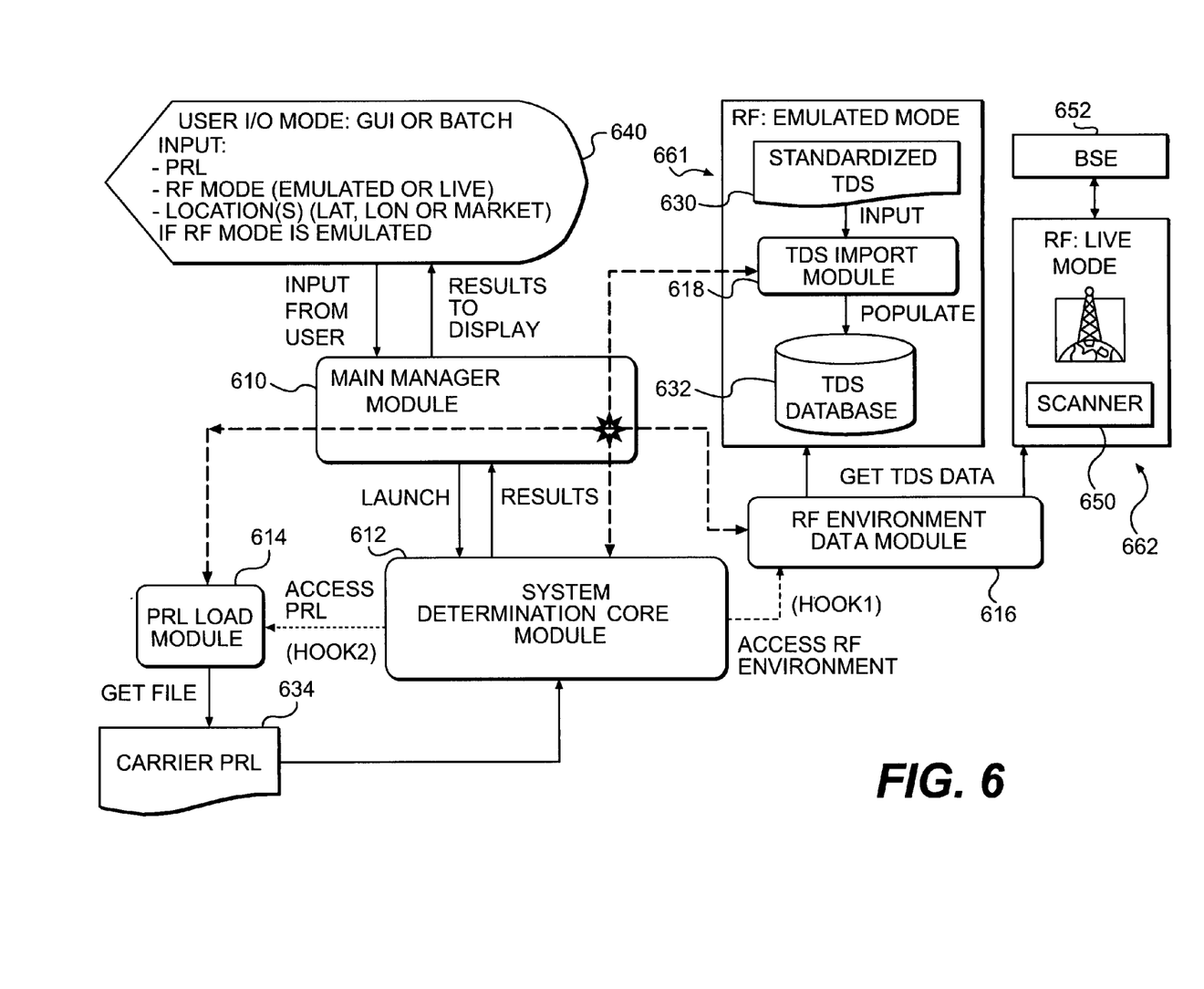
FIG. 6 illustrates an example of the system operation.

FIG. 6 is a schematic block diagram showing an example of the system operation. Depicted are software modules, which include a main manager module 610, a system determination core module 612, a PRL load module 614 an RF environment data module 616 and a TDS import module 618. Input sources include a standardized TDS 630 memory store, a memory store 632 for loaded TDS databases and a memory store 634 for a loaded operator PRL. A user I/O mode module 640 represents a user interface. Additionally, a live scanner 650 provides actual communication with a wireless network, such as through a base station or base station emulator (BSE) 652. Accordingly, the operational environment is set forth as either emulated mode 661 or RF-live mode 662, and in the case of emulated mode 661, a location selection.

While separate components are depicted for the different modules, it is anticipated that the various functions will be resident on common equipment. For example, PRL load module 614, RF environment data module 616 and TDS import module 618 are generally provided on a single mass storage device, and the software modules may be integrated into a single device such as the CPU of a computer. Likewise, it is anticipated that a common mass memory may be used for the memory stores 630-634, as well as with memory associated with computing modules (e.g., system determination module 612).

The bold dashed arrows indicate the control flow that the main manager module is controlling the launching of the other modules. The solid thin line arrows indicate process flow's and the direction of the information flow. The small dotted arrows represent "hooks" that exist in the system determination core module 612.

Figure 7:
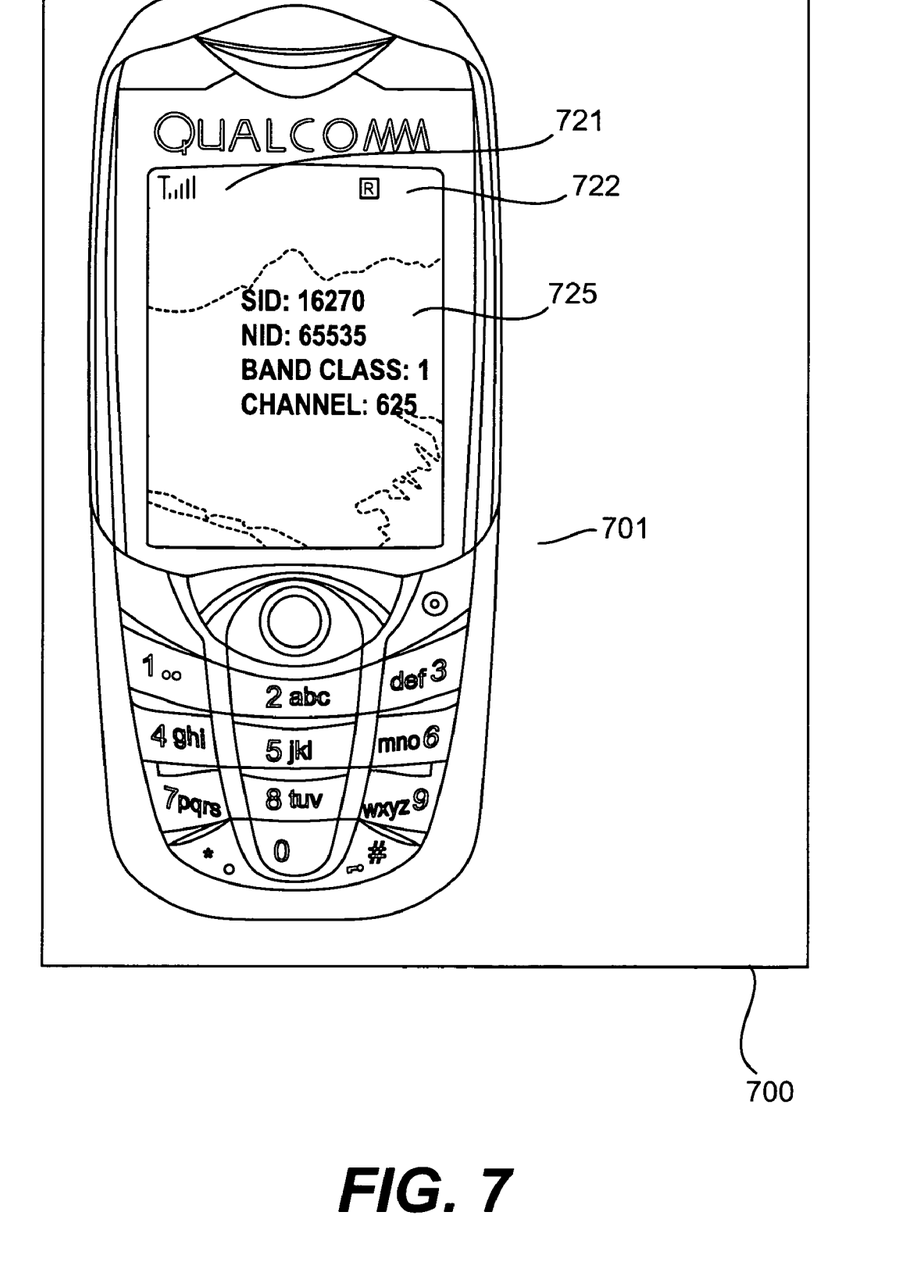
FIG. 7 illustrates an example display interface providing a graphic depiction of a simulation output.

The display function of the user I/O module 640 can take various forms, FIG. 3 mentioned above being one example. A more graphic display interface 700 is depicted in FIG. 7. The display 700 includes a representation of a phone (WCD), which indicates to the user the desired information. Depicted is real or emulated signal strength 721, roaming status 722 and a description and identity of the communication link 725. In the display 700, the user is provided with information regarding the communication link.

Figure 8:
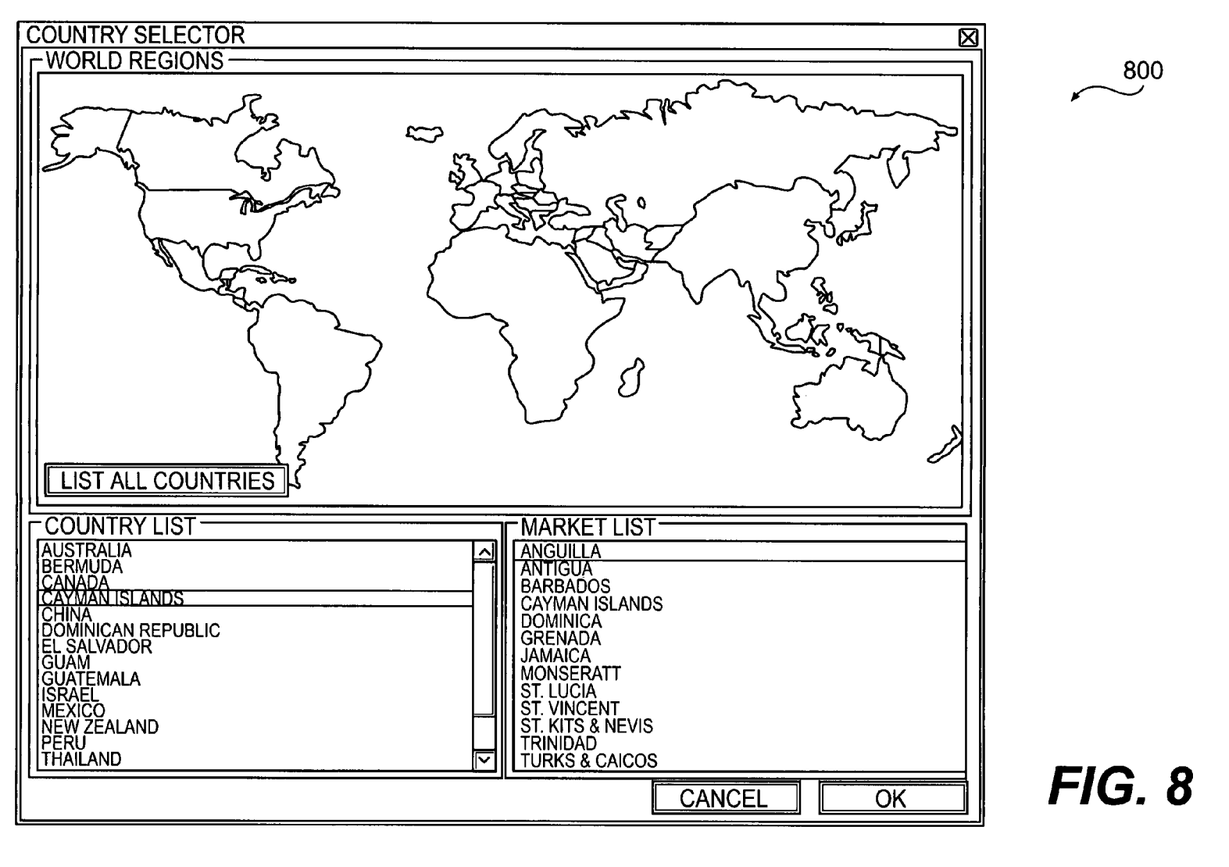
FIG. 8 illustrates an example location selection display.

FIG. 8 shows an example location selection display 800, in which the user can select a location based on graphic and textual locations. The depicted display shows international coverage; however, local listings of markets and regions can also be provided. In addition, the user may input location data according to equipment identifiers and lat/long coordinates. The user can also manually specify other available markets. The systems are scanned based on a market location that a user is currently in according to the emulation. A "change location" function allows the user to specify a new location. This permits the user to provide simulations in accordance with a selected location, using the data provided as part of the TDS input 240. This allows the user to run simulations based on different locales, in which the wireless environment in different regions, markets, sub-markets can be simulated. This also permits the user to run simulations based on a physical location, while using the device 200 to determine the wireless environment which applies to that location, based on the TDS. The simulations can be made with the "Bleed Systems" selection (FIG. 3) on or off, as desired, in order to permit "bleed" from neighboring markets or systems to be introduced into the simulation.

Figure 9:
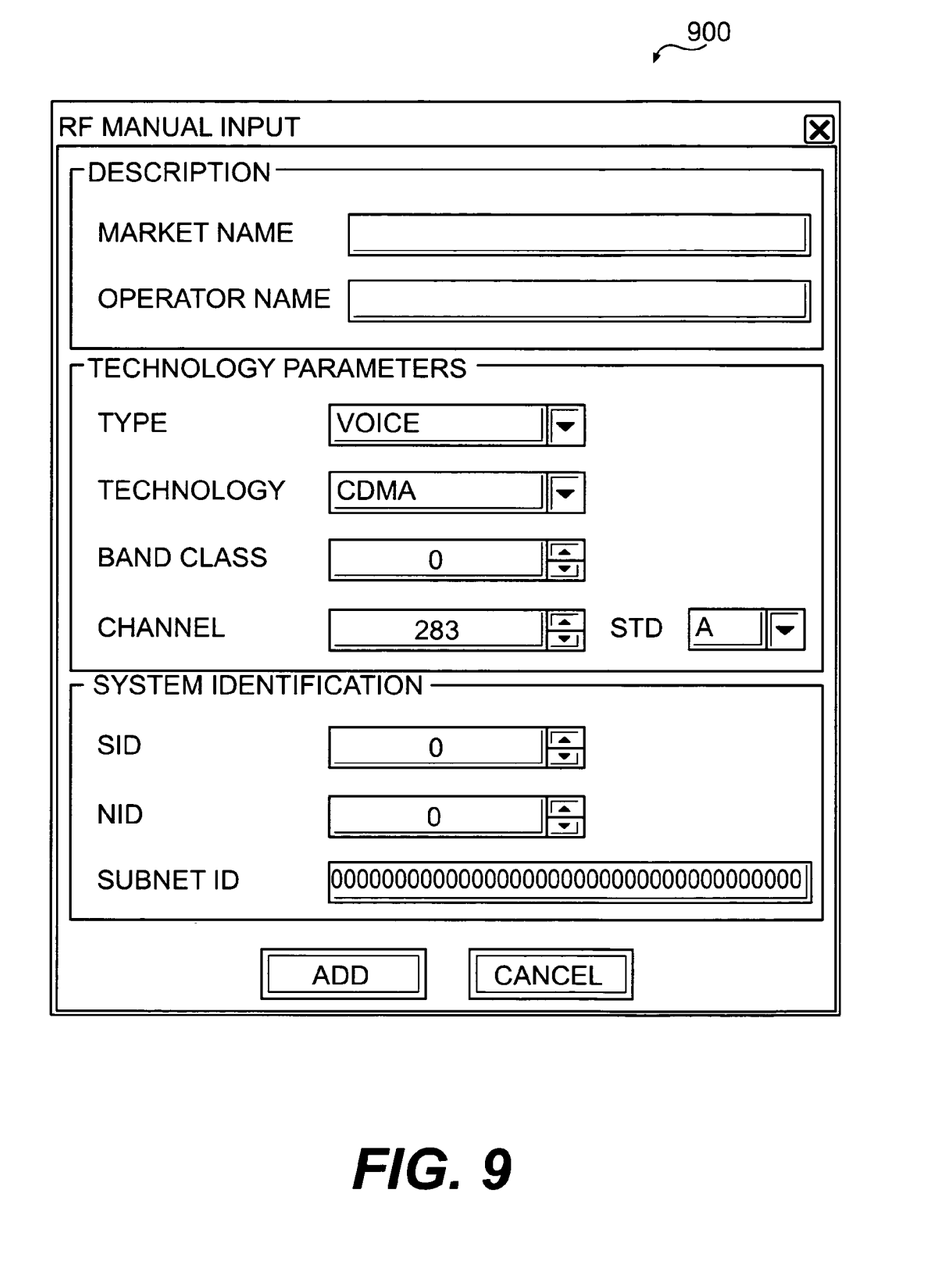
FIG. 9 illustrates an illustrates an example display providing for manual input of data.

FIG. 9 shows an example display 900 providing for manual input of data. If the user is able to identify specific characteristics of the operation of a WCD, then this can be manually input without attempting to manually convert the information to match a graphical format. This also permits the user to use the simulation device 200 to test the effect of changes in base station equipment, channel assignments and the like by manually inputting these changes.

Figure 10:
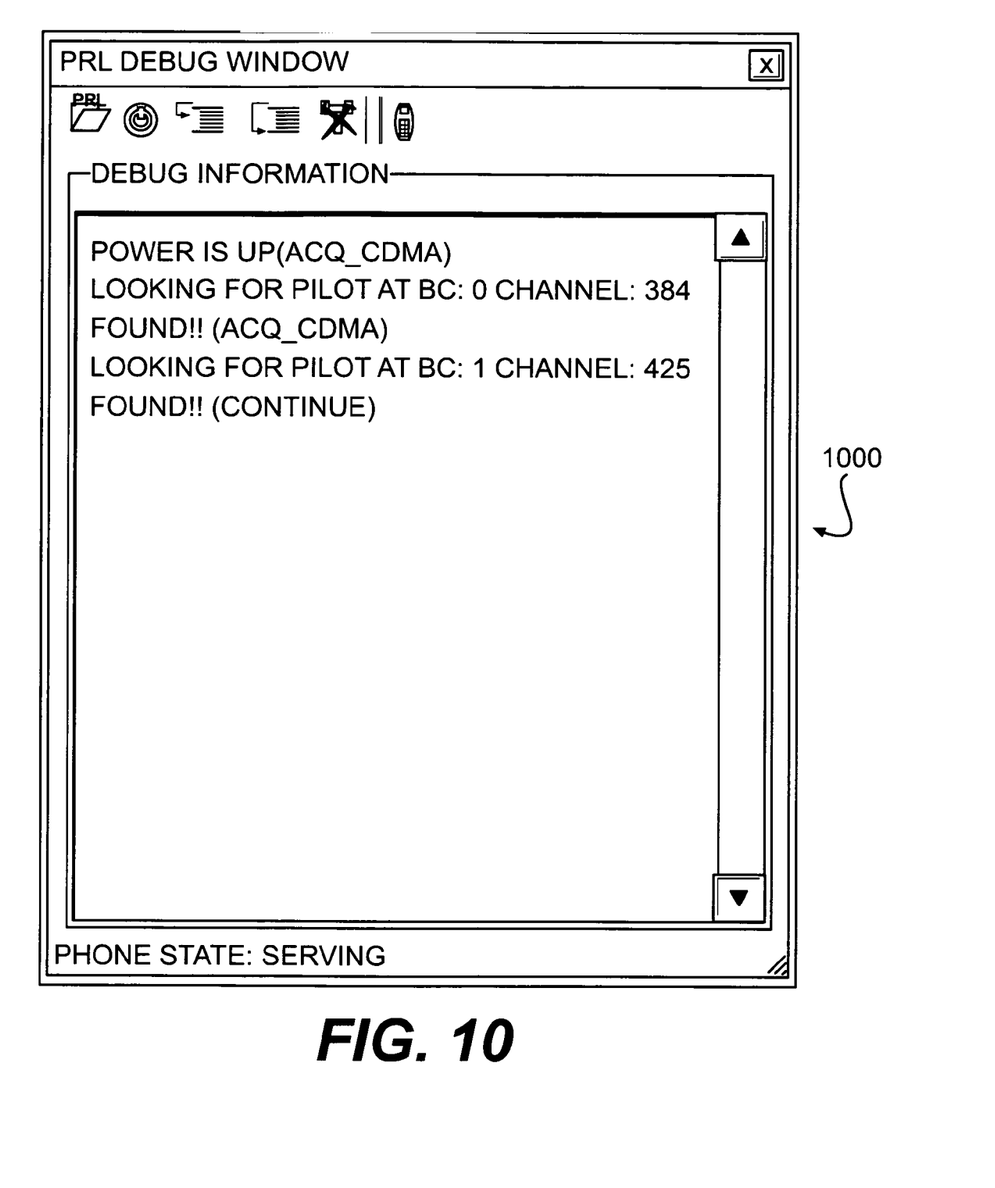
FIG. 10 illustrates an example "debug mode" display.

FIG. 10 shows an example "debug mode" display 1000. Selections may be provided on the display window's toolbar to perform various debug functions and simulate "what if" scenarios. In the depicted example, two pilot signals are acquired, and the results are displayed. "Debug mode" functions may include:

Load PRL—Allows the user to select a PRL from the file system in order to load it into the software.

Turn The Phone On/Off—Turns the software's phone emulation on or off

Try Next Channel—Tries to acquire the next channel on the scan list

Acquire Next System—Tries to acquire next system by executing a "Try Next Channel" procedure until the result is System Acquired.

Declare current System Lost—Release the current serving system.

In addition, a "Phone Mode" changes the mode to "phone" which means that the software will behave as a phone automatically. In doing so, it will try to acquire systems when in scanning mode and re-acquire the system when the system is no longer available through the current link.

Accordingly, a tool for emulating system determination for testing of wireless roaming functions including roaming based on a roaming list can be provided. It should be noted that the various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, microprocessor, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a microprocessor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Figure 11:
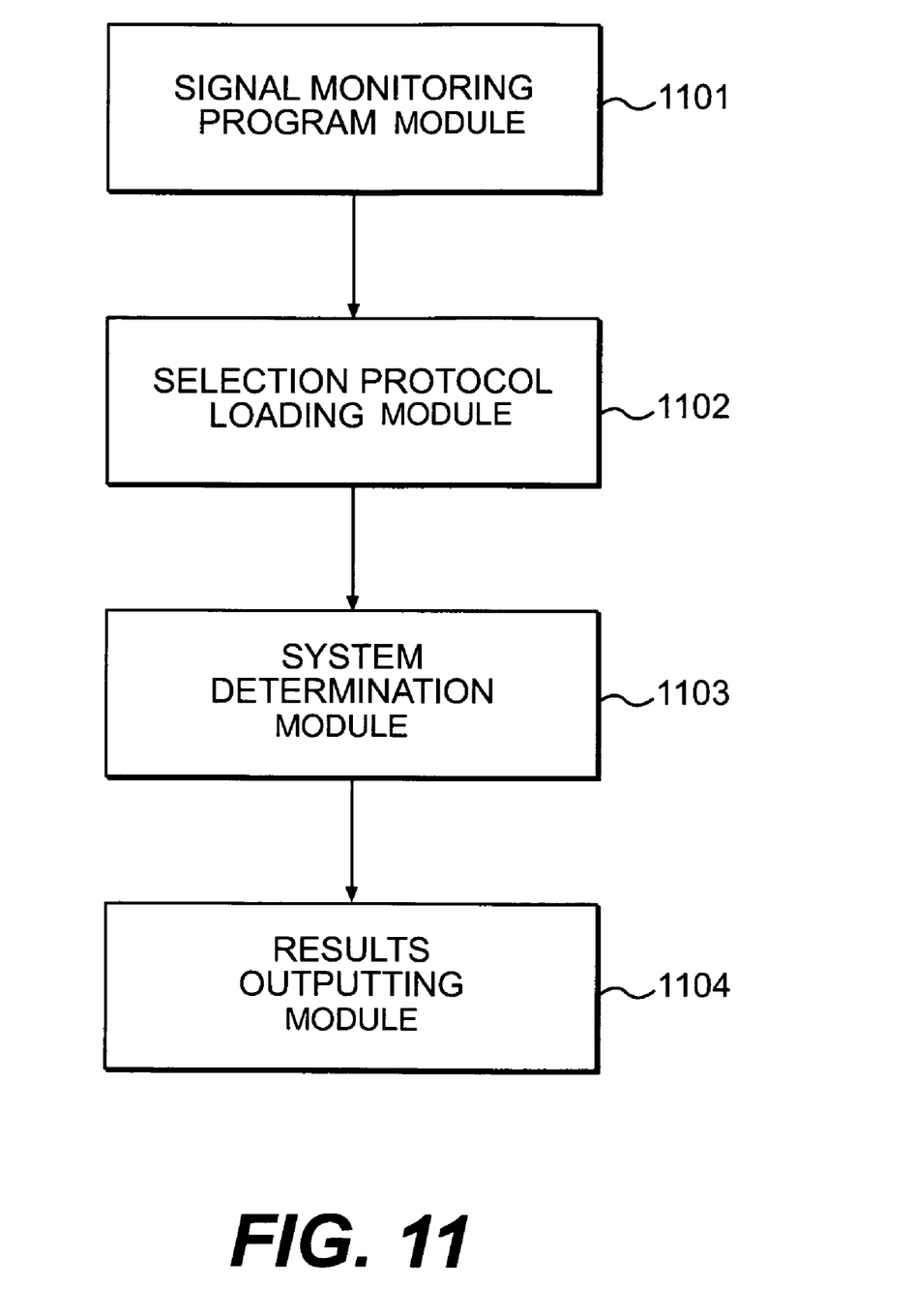
FIG. 11 illustrates another example device used in monitoring the operation of a WCD during system acquisition.

For example, FIG. 11 illustrates another device that can be used in monitoring the operation of a WCD during system acquisition. Signal monitoring program module 1101 is configured to provide signal emulation in accordance with a set of algorithms and signal processing techniques. Selecting protocol loading module 1102 is configured to receive an output from the signal monitoring program module 1101 and receive a stored signal measuring program. Service selection protocol loading module 1102 can accept the service selection protocol, such as a PRL. System determination module 1103 is configured to take a procedure based on the service selection protocol and the signal monitoring program, and perform system determination. Results outputting module 1004 is configured to output the results of the system determination.

Accordingly, an apparatus for use in monitoring the operation of a wireless communication device during system acquisition may comprise means for loading a signal monitoring program; means for loading a service selection protocol; means for performing a system determination procedure based on the service selection protocol and the signal monitoring program; and means for outputting the results of the system determination. The apparatus may also comprise means for receiving data corresponding to data from a technical data sheet, wherein the means for performing the system determination emulates the system determination based on the data from the technical data sheet. The apparatus may further comprise means for loading library files, wherein the signal monitoring program executes using the library files. Additionally, the apparatus may comprise means for simulating "system bleed" by introducing interaction of wireless services across wireless service regions. These functions may be provided as described above in connection with FIGS. 1-9, and the various means may take the form of a combined simulation apparatus.

Here, the means for loading a signal monitoring program may be either generic, a representation of a signal acquisition function of a particular WCD, or may be actual signals. In some embodiments, the means for loading a signal monitoring program may comprise signal monitoring program module 1101. The means for loading a service selection protocol may comprise selecting protocol loading module 1102. The means for performing a system determination procedure may comprise system determination module 1103. The means for outputting the results may comprise results outputting module 1104. Alternatively, the means for loading a signal monitoring program, the means for loading a service selection protocol, and the means for performing a system determination procedure may comprise processing module 220. Similarly, the means for outputting the results may comprise output module 230.

Furthermore, it should be noted that a processor may be implemented to perform the one or more portions of the method and/or functions of devices as described above. Similarly, a machine readable medium storing instructions may be implemented to perform the one or more portions of the method and functions of devices as described above.

Therefore, previous description of the disclosed embodiments is provided to enable a person skilled in the art to make or use the present invention. Various modifications to these embodiments will be readily apparent to those skilled in the art, and the generic principles defined herein may be applied as will be apparent to those skilled in the art. For example, one or more elements can be rearranged and/or combined, or additional elements may be added. Thus, the present invention is not intended to be limited to the embodiments shown herein but is to be accorded the widest scope consistent with the principles and novel features disclosed herein.

What is claimed is:

1. An apparatus for use in monitoring the operation of a wireless communication device during system determination, the apparatus comprising:
   a memory store configured to store a signal monitoring program and configured to store a service selection protocol comprising a roaming list;
   a signal emulator configured to provide a signal emulation output in accordance with a set of data;
   a processor coupled to the memory store, the processor configured to perform a simulation of a service selection procedure based on the roaming list and performed in accordance with the signal monitoring program and the signal emulation output; and
   an output interface coupled to the processor and configured to output a result of the service selection procedure.

2. The apparatus of claim 1, wherein the signal emulator is configured to provide signal emulations in accordance with a database of signal sources.

3. The apparatus of claim 2, wherein the processor is configured to provide simulated signal inputs for use by the signal emulator, the simulated signal inputs established according to a location selection provided to the signal emulator.

4. The apparatus of claim 1, wherein the signal monitoring program comprises a station search protocol provided for simulation of service determination.

5. The apparatus of claim 1, wherein the service selection protocol provides a system determination procedure based on a list of available network services.

6. The apparatus of claim 1, wherein the signal emulator is configured to provide signal emulations in accordance with data from a technical data sheet.

7. The apparatus of claim 1, further comprising an input module coupled to the processor and configured to receive data in a format of a technical data sheet for use by the processor and convert the data in the format of the technical data sheet to a format for use by the processor.

8. The apparatus of claim 1, wherein:
   the service selection protocol provides a system determination procedure based on a list of available network services; and
   the roaming list comprises a preferred roaming list.

9. The apparatus of claim 1, wherein:
   the service selection protocol provides a system determination procedure based on a list of available network services; and
   the roaming list comprises a public land mobile network list.

10. The apparatus of claim 1, wherein:
    the signal monitoring program comprises a station search protocol and a service selection procedure utilized to provide roaming service selection; and
    the service selection procedure comprises a system determination procedure based on a list of available network services.

11. The apparatus of claim 1, further comprising a connection for receiving external signal inputs, whereby the external signal inputs provide data for the processor to utilize as the signal emulation output in lieu of the outputs of the signal emulator.

12. The apparatus of claim 1, wherein the service selection procedure comprises pilot scanning to provide system acquisition.

13. The apparatus of claim 1, wherein the processor is configured to provide emulation of system determination for power up of the wireless communication device and to provide emulation of system determination for reacquisition of a communication link after loss of the communication link.

14. The apparatus of claim 1, further comprising a user interface configured to receive commands to initiate the system determination, save a current result of the system determination, open a stored result of the system determination, emulate a wireless communication device power up, emulate a loss of a system, and emulate reacquisition of the system.

15. The apparatus of claim 1, further comprising a system bleed user interface configured to receive commands to introduce interaction of wireless services across wireless service regions.

16. The apparatus of claim 1, further comprising a display module configured to display the results of the system determination and a user interface,
    wherein the display module is further configured to display at least one of a scanning progress, a serving system, a location, a scan list, or an alternate scan list.

17. The apparatus of claim 1, further comprising:
    a display module configured to display the results of the system determination and a user interface,
    wherein the user interface is configured to receive commands to initiate the system determination, save a current result of the system determination, and open a stored result of the system determination.

18. An apparatus for use in monitoring the operation of a wireless communication device during system acquisition, the apparatus comprising:
- means for loading a signal monitoring program;
- means for loading a service selection protocol comprising a roaming list;
- means for providing a signal emulation output in accordance with a set of data;
- means for performing a system determination procedure based on the roaming list and performed in accordance with the signal monitoring program and the signal emulation output; and
- means for outputting a result of the system determination.

19. The apparatus of claim 18, further comprising:
- means for receiving data corresponding to a technical data sheet, wherein the means for performing the system determination is further configured to emulate the system determination based on the technical data sheet.

20. The apparatus of claim 18, further comprising means for simulating system bleed by introducing interaction of wireless services across wireless service regions.

21. A computer program product for use in monitoring the operation of a wireless communication device during system acquisition, the computer program product comprising:
- a non-transitory computer readable medium comprising:
  - code for causing a computer to load a signal emulation program for providing a signal emulation output in accordance with a set of data;
  - code for causing the computer to load a signal monitoring program;
  - code for causing the computer to load a service selection protocol comprising a roaming list;
  - code for causing the computer to perform a system determination procedure based on the roaming list and using the signal emulation output; and
  - code for causing the computer to output the results of the system determination.

22. The computer program product of claim 21, wherein the signal emulation program is configured to cause the computer to provide signal emulations in accordance with a database of signal sources, and to provide the signal emulation output according to a location selection.

23. A method for monitoring the operation of a wireless communication device during a cell search procedure, the method comprising:
- loading a signal monitoring program and a service selection protocol comprising a roaming list from a memory store;
- providing a signal emulation output;
- performing a simulation of a service selection procedure based on the roaming list in accordance with the signal emulation output and the signal monitoring program; and
- outputting the results of the simulation of the service selection procedure.

24. The method of claim 23, further comprising:
- selecting a location; and
- modifying the signal emulation output in accordance with the location.

25. The method of claim 23, wherein the providing of the signal emulation output comprises utilizing data corresponding to a technical data sheet in order to emulate a signal in accordance with the technical data sheet.

26. The method of claim 23, wherein the performing of the simulation of the service selection procedure comprises pilot scanning to provide system acquisition.

27. The method of claim 23, further comprising selectively receiving external signal inputs, whereby the external signal inputs provide data for performing the simulation of the service selection procedure.

28. The method of claim 23, further comprising providing a user interface configured to receive commands for initiating a system determination, saving a current result of the system determination, opening a stored result of the system determination, emulating a wireless communication device power up, emulating a loss of a system, emulating a reacquisition of the system, and displaying the results of the system determination.

29. The method of claim 23, further comprising providing a system bleed user interface configured to receive commands for introducing an interaction of wireless services across wireless service regions.

* * * * *